(12) United States Patent
Moser

(10) Patent No.: US 12,167,788 B2
(45) Date of Patent: Dec. 17, 2024

(54) DISPENSER AND METHOD OF ASSEMBLING A DISPENSER

(71) Applicant: medmix Switzerland AG, Haag (CH)

(72) Inventor: Josef Moser, Unterkulm (CH)

(73) Assignee: medmix Switzerland AG, Haag (CH)

( * ) Notice: Subject to any disclaimer, the term of this patent is extended or adjusted under 35 U.S.C. 154(b) by 0 days.

(21) Appl. No.: 18/279,017

(22) PCT Filed: Mar. 14, 2022

(86) PCT No.: PCT/EP2022/056480
§ 371 (c)(1),
(2) Date: Aug. 25, 2023

(87) PCT Pub. No.: WO2022/194750
PCT Pub. Date: Sep. 22, 2022

(65) Prior Publication Data
US 2024/0138555 A1  May 2, 2024

(30) Foreign Application Priority Data

Mar. 16, 2021  (EP) .................................... 21162796

(51) Int. Cl.
*A46B 11/00* (2006.01)
*A61C 3/00* (2006.01)
*B05C 17/005* (2006.01)

(52) U.S. Cl.
CPC .......... *A46B 11/0041* (2013.01); *A61C 3/005* (2013.01); *B05C 17/00506* (2013.01); *A46B 11/0079* (2013.01)

(58) Field of Classification Search
CPC . A46B 11/0041; A46B 11/00; A46B 11/0003; A46B 11/001; A46B 11/0079; A46B 11/0086; A61C 3/005; A61C 3/00; B05C 17/00506; B05C 17/005; B05C 17/00503
USPC ................. 401/183–185, 270, 272, 275, 280
See application file for complete search history.

(56) References Cited

U.S. PATENT DOCUMENTS

| | | | |
|---|---|---|---|
| 4,741,737 A * | 5/1988 | Meyer ..................... | A61M 5/20 604/231 |
| 6,059,570 A * | 5/2000 | Dragan .................... | A61C 5/50 433/80 |
| 7,465,119 B2 * | 12/2008 | Sogaro ................ | A61M 35/003 401/188 R |
| 7,841,793 B2 * | 11/2010 | Ramet .................... | A45D 34/04 401/265 |

(Continued)

*Primary Examiner* — David J Walczak
(74) *Attorney, Agent, or Firm* — Global IP Counselors, LLP

(57) ABSTRACT

A dispenser includes a container, an applicator and a head part. The head part has the applicator, and is axially moveable relative to an outlet of the container. The head part includes a passage connected to the applicator in a fluid conducting manner, the passage further being connected to the container in a fluid conducting manner in an activated state of the dispenser and with no fluid communication being possible in a storage state of the dispenser. The passage extends along an outer circumferential surface of the head part, the head part having a base with a seal configured to seal with respect to the outlet of the container in the storage state of the dispenser.

24 Claims, 3 Drawing Sheets

(56) References Cited

U.S. PATENT DOCUMENTS

2004/0033466 A1\* 2/2004 Shellard .................. A61C 5/62
433/89

\* cited by examiner

DISPENSER AND METHOD OF ASSEMBLING A DISPENSER

CROSS-REFERENCE TO RELATED APPLICATION

This application is a U.S. National Stage application of International Application No. PCT/EP20221056480, filed Mar. 14, 2022, which claims priority to European Application No. 21162796.3, filed Mar. 16, 2021, the contents of each of which are hereby incorporated by reference.

BACKGROUND

Technical Field

The disclosure relates to a dispenser and to a method of assembling a dispenser.

Background Information

Dispensers for the application of fluids are commonly used. Such dispensers can be used with low viscous fluids and high viscous fluids. Especially in a medical, dental or veterinary environment, for instance for dental compounds, tissue adhesives or other medical applications, the dispensers need to be changed often, especially after each single usage or at least before the treatment of the next patient in order to avoid spreading infectious diseases from one patient to another. Another reason can be to avoid energy-intensive cleaning processes. All in all, this results in a high consumption of dispensers.

SUMMARY

Also, it has been determined that in view of a background of most cost-efficient but also environmentally sound production it is desirable to keep material consumption as low as possible, however, without compromising user friendliness.

Therefore, it is an object of the disclosure to provide an improved dispenser and an improved method of assembling a dispenser. This object is solved by the subject matter disclosed herein.

In particular, a dispenser is provided, which comprises a container, an applicator and a head part. The head part has the applicator and is axially moveable relative to an outlet of the container. The head part further comprises a passage connected to the applicator in a fluid conducting manner, with the passage further being connected to the container in a fluid conducting manner in an activated state of the dispenser and with no fluid communication being possible in a storage state of the dispenser. The passage extends along an outer circumferential surface of the head part. Furthermore, the head part has a base with a seal configured to seal with respect to the outlet of the container in the storage state of the dispenser.

With the dispenser according to the disclosure comprising a comparatively simple design, it is possible to produce a great amount of dispensers in a rather short period of time, i. e. in a cost-effective way.

The simple design nevertheless comprises a high functionality and robustness in view of wear and tear since the dispenser can be designed as a three- or even two-piece dispenser, thereby reducing the amount of components drastically compared to other dispensers of the art. In particular, the head part and applicator can be formed integrally such that the dispenser only consists of two pieces, i. e. the head part and the container. In an alternative embodiment the applicator can be fabricated separately and fixed to the head part.

Either way, the dispenser according to the disclosure can be a single-use device as well as a reusable device.

The head part and the container are connected such that the head part is axially movable relative to an outlet of the container such that the head part can be brought from a storage state to an activated state, in which the fluid should be dispensed. This movement can, for example, be carried out by a user by pressing the head part towards the container.

In the storage state the seal, which is provided at the base of the head part seals the opening of the container such that no fluid can exit the container via the outlet. In the activated state, on the other hand, the passage of the head part is connected with the applicator as well as with the container in a fluid conducting manner such that the fluid can be dispensed out of the container via the applicator.

These two states of the dispenser are realized by providing the passage along an outer circumferential surface of the head part. Such a design has the advantage that there is no need for further passages and canals inside the container which have to be connected with the passage of the head part in order to be able to provide a fluid conducting canal.

Bringing the dispenser in the activated state can mean that the dispenser can be made ready to use and/or that the dispenser additionally can already dispense the fluid as soon as the passages are connected in a fluid conducting manner, thereby not only activating the dispenser but also already dispensing the fluid.

In this connection it is noted that the passage of the head part can also comprise a section, which is open at one side such that the open side of the passage can be brought into contact with an inner surface of the container, when the dispenser is in the storage state.

Additionally, the seal at the base of the head part further seals the container to promise a complete seal of the container. When the dispenser is in the activated state, on the other hand, the section opens into the container such that the fluid can flow into the passage.

In this connection it is further noted that the open section of the passage can in particular be arranged at a part of the container which lies between the opening of the container and the seal of the head part.

In this connection it should further be noted that the container or a part thereof can be squeezed in order to dispense materials stored therein, i.e. no piston assembly or pressurized container is used in order to discharge the materials from the dispenser.

According to an embodiment the dispenser is a unit-dose dispenser. In this connection it can be possible to provide a predetermined amount of fluid inside the container which can be dispensed by activating the dispenser all at once. This has the advantage that no further complicated dosing mechanisms are needed to being able to provide a precise amount of fluid at the application site. After using the device, it can be discarded and a new one can be used for the next treatment.

The dispenser can thus be a single use device having a pre-defined amount of material stored therein, with the dispenser being configured to dispense the single dose during one use of the dispenser.

According to another embodiment the head part is only axially moveable relative to the outlet of the container. This provides a particular simple way of using the dispenser since a motion in only one degree of freedom is possible. This motion then being pre-defined for ease of simple use of the dispenser.

The applicator can also be arranged at an angle to the container such that the application of the dispenser is simplified for the user. It is obvious that certain regions of a body, such as for example certain teeth, can be reached more easily if the applicator is provided at an angle such that the hand of the user, which is actuating the dispenser, does not interfere with the applicator or with other body parts, i. e. for example other teeth.

The passage can further extend in an axial direction along an outer circumferential surface of the head part. That is, in some embodiments it is not necessary for the passage to extend, for example, along the whole circumference in a peripheral direction of the outer circumferential surface of the head part. For the embodiments it can be sufficient when the passage only extends in an axial direction such that the passage directly leads from the container to the applicator along the shortest possible path. This can also further reduce the fabrication costs since a straight passage extending only in an axial direction represent a particularly simple design.

Alternatively, it can also be possible that the passage does not directly lead to the applicator, but is rather extended along the circumference of the head part. This can be beneficial for embodiments where a precise application of a certain amount of fluid is crucial. By extending the length of the passage, the fluid can be dosed more accurately.

According to an embodiment the applicator comprises a core extending over its length within the applicator, with optionally a first end of the passage opening into the core of the applicator. Hence, the applicator can comprise a core, e. g. a canal or channel, which can be in, in particular permanent, connection with the passage of the head part such that the fluid, which enters the passage when the dispenser is in the activated state, can flow through the passage into the core and out of the dispenser via a dispensing opening of the applicator at which for example brushes a dispensing outlet a foam or the like can be arranged.

It can further be possible that a second end of the passage ends at the seal such that the seal can caulk the container properly. With the second end of the passage ending at the seal it can be ensured that the passage does not open into the container when the dispenser is in the storage state.

Furthermore, it can be possible that a top end of the head part comprises a radially extending ledge. The ledge can either extend along the whole circumference of the top end of the head part. Alternatively, it can also be possible that the ledge is interrupted by the applicator if the applicator is arranged at an angle to the container. Either way, the ledge can limit the axial movement of the head part with respect to the container in one direction, i.e. in a moving direction towards the container, by coming into contact with the container.

The top end of the head part can further rest on a front end of the outlet in the activated state. For example, if the front end of the head part comprises the above mentioned ledge, the ledge can rest on the front end of the outlet. Alternatively, the top end of the head part can also comprise further movement limiting features or can be formed such that the top end can rest on the front end of the outlet.

According to another embodiment an application end of the applicator comprises one or more brushes. Such brushes can, for example, be of particular interest in the field of dental applications where brushes can be needed for better and easier application of the dental compound. Another field of application for such brushes can be the application of tissue adhesives when a wound of a human or animal is supposed to be closed with the adhesive. Such brushes can simplify the application of the adhesive at the wound.

The applicator can also be integrally formed at the head part. As already mentioned above, such an integral design of the applicator and the head part reduces the amount of components which need to be fabricated such that the fabrication costs as well as the fabrication time can be reduced. Furthermore, an integral design of the applicator and the head part has shown to be more robust, which is particularly crucial in reusable dispensers.

In this connection it should be noted that the head part, like the container can be formed in one piece in an injection mold or by additive manufacturing such as 3D printing.

The dispenser can be a pipette type of dispenser such that the doses of fluid which are supposed to be dispensed rather easily by actuating, i.e. for example pressing, a part of the dispenser, especially a part of the container. Hence, according to this embodiment, the dispenser is first being brought into the activated state by moving the head part towards the container. Then, the dispenser is actuated, i.e. used, by for example pressing the container itself.

According to an embodiment the dispenser is of tubular design. Such a design is easy to fabricate as well as easy to use.

According to another embodiment the outlet comprises a cut-out configured to receive a part of the applicator in the activated state of the dispenser. In particular, it can be possible that the cut out receives part of the applicator if the applicator is provided at an angle to the container.

As already mentioned earlier the dispenser can be displaced from the storage state into the activated state by axially pressing the head part towards the container which can be done rather easily by a user by pressing the head part with a finger.

According to another embodiment the container can comprise a reservoir and a filling part remote from the head part with the reservoir being configured to be filled with a fluid via the filling part.

In this connection it is noted that the container can further also comprise a transition between the reservoir and the filling part. The transition can for example adapt the diameter of the reservoir to the diameter of the filling part which can not be the same. In some cases the transition can simply connect the reservoir with the filling part. In other cases the transition can also be sealed or otherwise closed to some extend to only connect the reservoir with the filling part in a fluid conducting manner only at certain parts along the diameter and/or along the area of the transition.

According to another embodiment the container can comprise at least one channel, with the channel optionally extending through the transition. That is, if for example the transition closed to some extent, the connection that still fluidly connects the reservoir with the filling part can be configured as at least one channel that comprises a smaller diameter than the transition. In other embodiments the at least one channel can also comprise the same diameter as the transition and/or the reservoir and/or the filling part. It is also possible to have more than one channel, thereby providing a plurality of channels extending through the transition.

According to another embodiment the transition comprises a sealing zone through which the at least one channel extends to connect the reservoir with the filling part in a fluid conducting manner. That is, the transition can be sealed at certain parts such that only the at least one channel connects the reservoir and the filling part.

The at least one channel can further also extend into the filling part.

The channel can further comprise a small diameter, i.e. a diameter selected in the range of 0.1 to 1.5 mm, in particular a diameter that is smaller than 0.8 mm, such that the surface tension of the fluid will prevent the fluid from entering the channel, thereby preventing the fluid from flowing back into the filling part. It has been shown that such a configuration has the advantage that the precise dimensions of the channel (s) can be adapted rather easily to the fluid stored inside the dispenser such that the above described effect can take place.

According to another embodiment the dispenser further comprises a filling end at the filling part and remote from the head part. The filling end can be used, for example, to fill the dispenser with a fluid. In some cases the filling end can be closed, for example sealed, after the container has been filled with the fluid.

It is further also possible that the head part and the applicator are made in one single piece such that the dispenser is made out of two single pieces, i.e. the head part and the container. Such a configuration has proven to be particularly robust and easy to produce such that the manufacturing costs and time can be decreased significantly.

In this connection it is also noted that the dispenser can be a pipette type dispenser. Such dispensers are particularly easy to handle.

According to an embodiment the dispenser can further comprise a valve element arranged at an end of the reservoir remote from the head part. Such a valve element prevents liquid from flowing back into the filling part of the dispenser such that less pumps are needed to empty a dispenser completely.

In this connection it should be noted that the valve element can further be arranged at an end of the at least one channel opening into the reservoir such that it can effectively seal the channel.

According to another aspect of the disclosure a method of assembling a dispenser, in particular a dispenser according to the disclosure, is provided, with the dispenser comprising a container, a head part and an applicator connected to the head part. The method comprises the steps of providing the container, the head part and the applicator, attaching the head part at the container, filling the container with a fluid at a filling end of the container remote from the head part, and welding the container at the filling end. Optionally the step of welding can further comprise welding the container at the filling end at two positions. This provides a particularly simple way for assembling a dispenser. With the method according to the disclosure a ready-to-use dispenser can be provided which can be fabricated in a simple and fast way since only a few amount of separate components have to be provided.

BRIEF DESCRIPTION OF THE DRAWINGS

Embodiments of the present invention will be explained in more detail with reference to the drawings.

DETAILED DESCRIPTION

Figure 1:
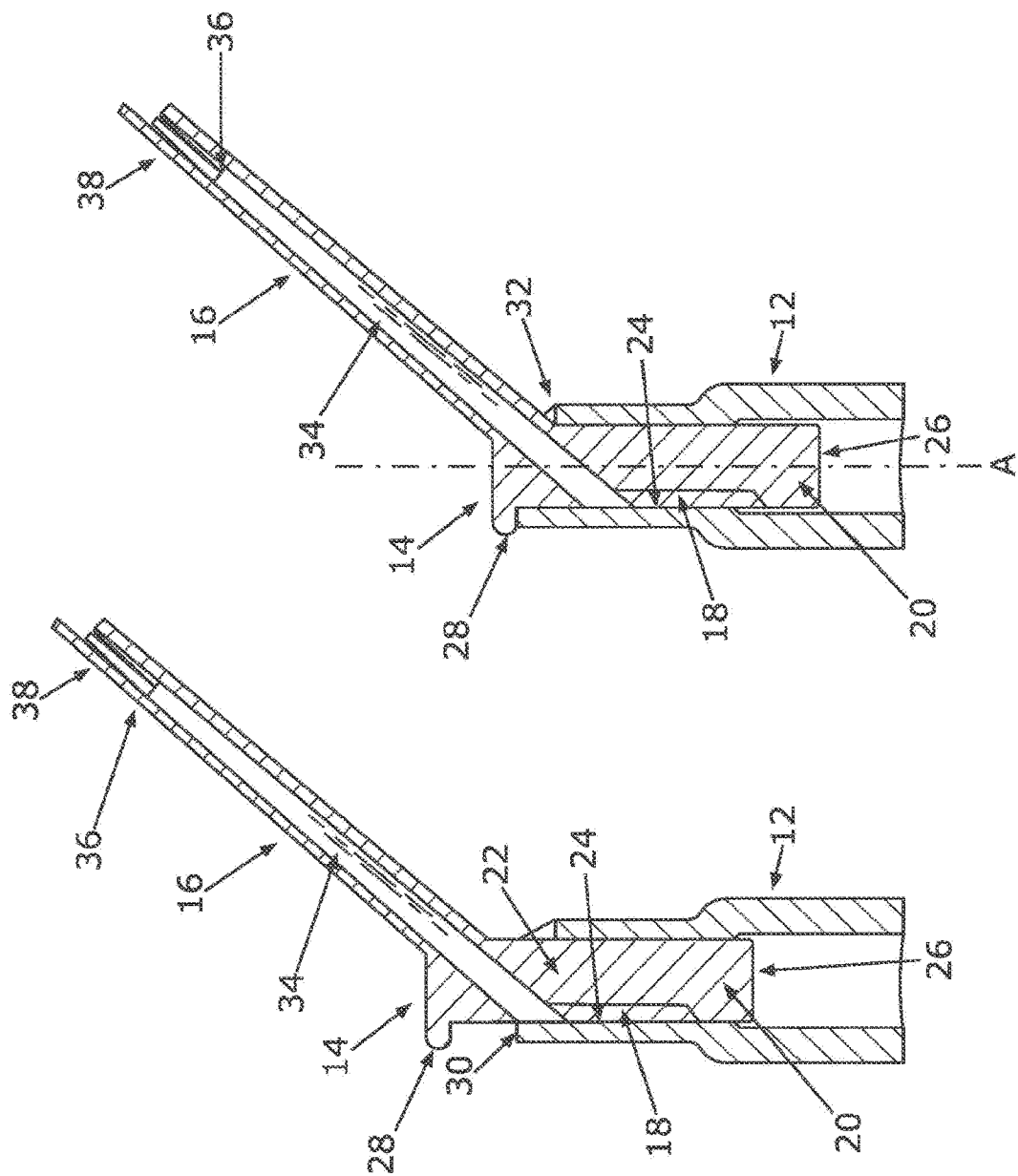
FIG. 1 illustrates part sectional views of a dispenser in the activated and the storage state.

FIG. 1 shows a part of a dispenser 10 comprising a container 12 filled with a fluid F, a head part 14 and an applicator 16. The container 12 comprises an opening 22. The head part 14 is configured to be at least partially be placed inside the container 12.

The left view of FIG. 1 shows the dispenser 10 in the storage, i.e. the closed, state whereas the right view of FIG. 1 shows the dispenser 10 in the activated, i.e. the open, state.

As one can also see, the head part 14 further comprises a passage 18 which is arranged at an outer circumferential surface of the head part 14. The passage 18 can be open at one side such that, at least in the storage state, the passage 18 comes into contact with an inner surface 24 of the container 12 (see also right view of FIG. 2). Furthermore, the passage 18 can be designed as an axial passage 18, as can be seen in the Figures. The passage 18 extends in parallel to a central axis A that extends through the opening 22 of the container 12.

In other embodiments the passage 18 can also be arranged along parts or the whole circumference of the outer surface of the head part 14. This can be beneficial in embodiments where the precise dosing of the fluid is crucial. A longer passage 18 can help to dose the fluid F more precisely.

In this connection it should be noted that a length of the passage 18 can be selected in the range of 0.1 to 5 cm, especially in the range of 0.2 to 1.5 cm.

In this connection it should further be noted that a width of the passage 18 can be selected in the range of 0.02 to 5 mm, especially in the range of 0.05 to 2 mm.

A cross-section of the passage 18 in parallel to the central axis A can be selected as round, oval, square rectangular and triangular.

In this connection it should be noted that a cross-section of the opening 22 in parallel to the central axis can be round or oval, in particular with the opening 22 being of cylindrical design in parallel to the central axis A.

The head part 14 further comprises a seal 20 which is arranged at a base 26 of the head part, i.e. the part of the head part 14 which is placed inside the container 12 in both of states. The seal 20 is configured to caulk the container 12 when the dispenser 10 is in the storage state (see left part of FIG. 1).

This is realized by the container 12 comprising a definite shape, which is tapered towards a top section of the container 12. This way, the seal 20 closes the container completely once the dispenser 10 is brought into the storage state and leaves at least the passage 18 open when the dispenser 10 is in the activated state.

The seal 20 is typically press-fit into the opening 22 as it is dimensioned with a diameter that is larger than a diameter of the opening 22.

In this connection it should be noted that a material of the head part 14 can be different from a material of the container 12, i.e. a material of the head part 14 can be softer or harder than the material of the container 12. By selecting different material properties a function of the seal 20 can be improved.

Figure 2:
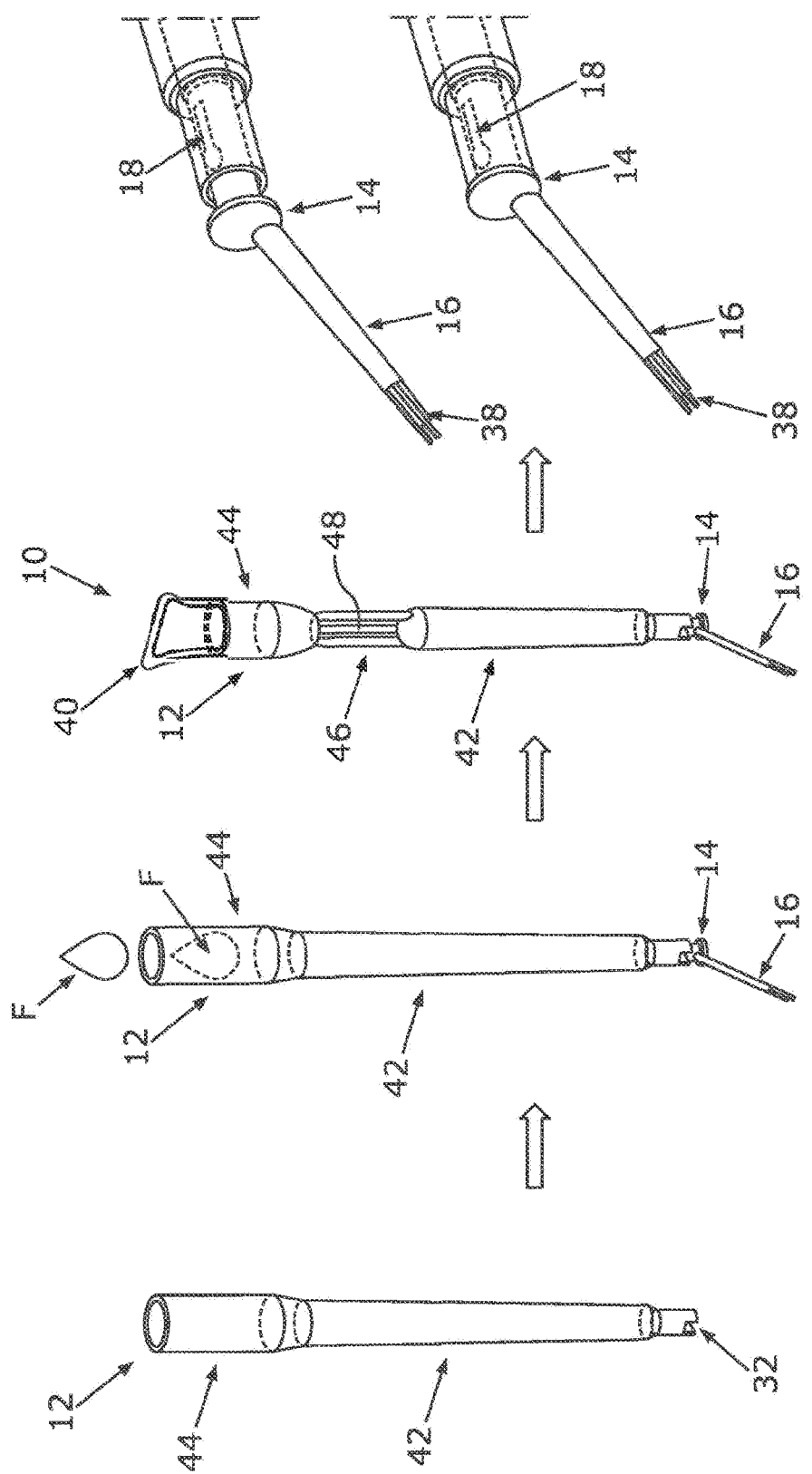
FIG. 2 illustrates different steps of assembling and using a dispenser.

In the embodiment shown in FIGS. 1 and 2 the head part 14 also comprises a ledge 28 which is arranged at an outer circumference of a top part of the head part 14. The ledge 28 is configured such that it limits the movement of the head part 14 towards the container 12 in the axial direction along the central axis A by allowing the ledge 28 to rest on a front end 30 of the outlet 22 (see right part of FIG. 1). The ledge 28 can be formed integrally with the head part 14.

In the embodiment depicted the applicator 16 is arranged at an angle of about 45° to the container 12. Therefore, the ledge 28 does also not extend around the whole circumference of the top part of the head part 14 but is rather interrupted by the applicator 16. Generally, it is possible to arrange the applicator 16 at any given angle with respect to the container 12. The precise angle can be chosen according to the application field of the dispenser 12.

In this connection it is noted that an angle between the applicator 16 and the central axis A of the container 12 is selected in the range of 30 to 60 degrees, especially in the range of 40 to 50 degrees.

Also, a length of the applicator 16 as well as the container 12 and therefore also the dispenser 10 as a whole can be chosen freely. The lengths can vary from one application to another.

When the applicator 16 is arranged at an angle to the container 12, with the angle between the applicator 16 and a central axis A of the container 12 being bigger than 45°, it can be beneficial for the container 12 to comprise a cut-out 32 which receives part of the head part 14, for example a part of the applicator 16, once the dispenser 10 is being brought into the storage state.

The applicator 16 can further comprise a core 34, for example in the form of a canal 34, extending over its length within the applicator 16 and which is connected with a first end of the passage 18 (see FIG. 1). A second end of the passage 18, on the other hand, ends at the seal 20. Hence, when the dispenser 10 is in the activated state, the fluid F can flow through the passage 18 inside the canal 34 and further out of the canal 34 at a dispensing opening 36 at an application end of the applicator 16.

The core 34 can be formed as a cylindrical shaped core 34 or in the manner of a truncated cone, i.e. with a diameter of the core 34 reducing over its length.

The core 34 can further be formed as a cannula, in particular of metal, which is overmolded by or inserted into and then fixed to the head part 14 prior to inserting the head part 14 into the container 12.

In this connection it should be noted that a length of the applicator between the dispensing opening 36 and the passage 18 can be selected in the range of 0.5 to 5 cm, especially in the range of 0.8 to 3 cm.

In this connection it should be noted that a ratio of the diameter of the core 34 to the diameter of the passage 18 can be selected as 0.5:1 3:1 at a position where the passage 18 and the core 34 merge.

At the dispensing opening 36 the applicator 16 can further comprise brushes 38 or anything alike which can help the user to apply the fluid F at its application site.

FIG. 2 shows the different steps of the method of assembling a dispenser 10. A container 12, a head part 14 and an applicator 16 which is connected with the head part 14 is provided. The container 12 further filled with the fluid F at a filling end 40 of the container 12 and then sealed, e. g. welded, at the filling end 40. The head part 14 can be inserted in the container 12 rather easily through its opening 22.

In the embodiment shown the container 12 comprises a reservoir 42 as well as a filling part 44. The reservoir 42 receives the fluid F once it is filled inside the container 12 through its filling part 44. The filling part 44 can comprise a bigger diameter than the reservoir 42.

One can further see in FIG. 2 that the container 12 can be welded not only at the filling end 40 but also at a transition 46 between the reservoir 42 and the filling part 44. In this connection it is noted that the transition 46 may not be welded completely to form at least one channel 48 (see FIG. 2) such that the filling part 44 can later be used as an actuation mechanism. That is, by pressing the filling end 44, which only contains air or another gas, the fluid F can be pressed out of the reservoir 42 inside the passage 18 and the canal 34 out of the dispenser 10 at the dispensing opening 36.

This is also the reason why the volume of the filling part 44 is selected to be 2 to 4 times larger than the volume of the reservoir 42. By comprising a larger volume, the complete volume of fluid F stored inside the reservoir 42 can be pressed, i. e. dispensed, out of the reservoir 42.

Furthermore, the channel(s) 48 comprise a diameter selected in the range of 0.1 to 1.5 mm, in particular smaller than 0.8 mm. With such small sized channels 48 it can be ensured that the fluid F stored in the reservoir 42 cannot flow back into the filling part 44 since the surface tension of the (viscous) fluid F prevents the fluid F from entering the channel(s) 48. Nevertheless, the air stored in the filling part 44 can flow through the channel(s) 48 when the filling part 48 is pressed, thereby subjecting the fluid F to a pressure such that it starts flowing out of the dispenser 10.

Figure 3:
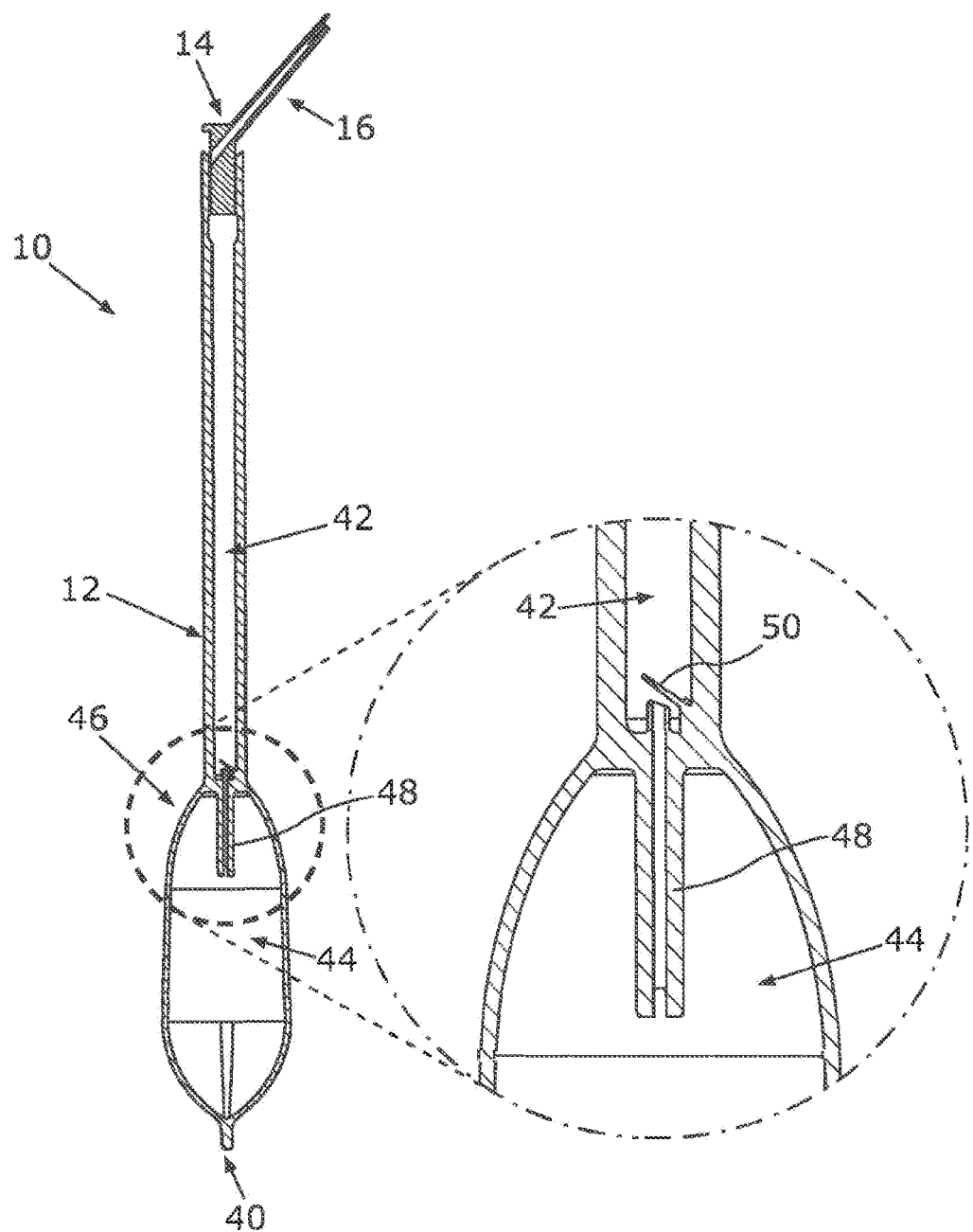
FIG. 3 illustrates another embodiment of the dispenser according to the invention.

In FIG. 3 one can see a further embodiment of the dispenser 10 according to the disclosure where the channel (s) 48 extend in the filling part 44.

It can further be possible that only the filling end 40 is welded such that the dispenser comprises the shape of a tube with the reservoir 42 and the filling part 44 being one and the same such that no channel(s) 48 are formed.

One can further see in the right part of FIG. 3 that in some embodiments the dispenser 10 can further comprise a valve element 50 arranged at the end of channel 48 opening into the reservoir 42.

The valve element can be a flap as is shown in FIG. 3 that can be lifted in the direction of flow of material on dispensing and that can be lowered again over the channel 48 after dispensing. Other forms of valve element (not shown) can also be utilized.

The flap can be hinged at one side of the channel 48 and open and close this in use.

Such a valve element, in particular in the form of a valve flap, can have the advantage that it prevents the fluid from flowing back into the filling chamber 44 once the user releases the pressure exerted on the dispenser 10. As a consequence, the user needs less press operations in order to disperse to complete content of the dispenser 10. That is, if pressure is applied to the dispenser, in particular to the filling part 44, the liquid stored as well as possible air stored therein will be pushed in a direction towards the head part such that the valve element 50 opens the channel 48. As soon as the pressure is released, the valve element 50 closes the channel again such that no liquid can flow back into the filling part 44.

In this embodiment one can also see that it is also possible that the channel 48 extends into the reservoir 42. In this way one can ensure that the valve element 50 can properly open and close the channel 48 during use 48.

As can be seen in the Figures the applicator 16 and the head part 14 can be formed integrally. Furthermore, the reservoir 42, the filling part 44 and the transition 46 can be formed integrally. This way it can be ensured that the dispenser 10 can be assembled out of only two components, thereby reducing the production/assembling costs as well as the production/assembling time massively and making the dispenser 10 more robust.

In this connection it should be noted that the container 12 and the head part 14 can respectively be formed by one of injection molding and additive manufacturing.

In this connection it should be noted that the parts of the dispenser can be formed by a plastic material, such as a thermoplastic elastomer, for example polypropylene, polyamide, polyethylene terephthalate, polyethylene, polyvincl chloride, polyoxymethylene and mixtures of the foregoing.

The invention claimed is:

1. A dispenser, the dispenser comprising:
   a container;
   an applicator;
   a head part, the head part having the applicator, the head part being axially moveable relative to an outlet of the container, the head part comprising a passage connected to the applicator in a fluid conducting manner, the passage further being connected to the container in a fluid conducting manner in an activated state of the dispenser and with no fluid communication being possible in a storage state of the dispenser, and the passage extending along an outer circumferential surface of the head part, the head part having a base with a seal configured to form a seal with respect to the outlet of the container in the storage state of the dispenser,
   the container comprising a reservoir and a filling part remote from the head part with the reservoir being configured to be filled with a fluid via the filling part; and
   a valve element arranged at an end of the reservoir remote from the head part.

2. The dispenser according to claim 1, wherein the dispenser is a unit-dose dispenser.

3. The dispenser according to claim 1, wherein the head part is only axially moveable relative to the outlet of the container.

4. The dispenser according to claim 1, wherein the applicator is arranged at an angle to the container.

5. The dispenser according to claim 1, wherein the passage extends in an axial direction along the outer circumferential surface of the head part.

6. The dispenser according to claim 1, wherein the applicator comprises a core extending over a length thereof within the applicator.

7. The dispenser according to claim 1, wherein a second end of the passage ends at the seal.

8. The dispenser according to claim 1, wherein a top end of the head part comprises a radially extending ledge.

9. The dispenser according to claim 8, wherein the top end of the head part rests on a front end of the outlet in the activated state.

10. The dispenser according to claim 1, wherein an application end of the applicator comprises one or more brushes.

11. The dispenser according to claim 1, wherein the applicator is integrally formed at the head part.

12. The dispenser according to claim 1, wherein the dispenser is a pipette type of dispenser.

13. The dispenser according to claim 1, wherein the dispenser is tubular.

14. The dispenser according to claim 1, wherein the outlet comprises a cut-out configured to receive a part of the applicator in the activated state of the dispenser.

15. The dispenser according to claim 1, wherein the dispenser is displaced from the storage state into the activated state by axially pressing the head part towards the container.

16. The dispenser according to claim 1, wherein the container further comprises a transition between the reservoir and the filling part.

17. The dispenser according to claim 16, wherein the container comprises at least one channel, with the channel extending through the transition.

18. The dispenser according to claim 17, wherein the valve element is arranged at an end of the at least one channel opening into the reservoir.

19. The dispenser according to claim 17, wherein the transition comprises a sealing zone through which the at least one channel extends to connect the reservoir with the filling part in a fluid conducting manner.

20. The dispenser according to claim 17, wherein the at least one channel extends into the filling part.

21. The dispenser according to claim 1, wherein the dispenser further comprises a filling end at the filling part and remote from the head part.

22. The dispenser according to claim 1, wherein the head part and the applicator are made in one single piece such that the dispenser is made out of two single pieces, including the head part and the container.

23. The dispenser according to claim 22, wherein the dispenser is a pipette type dispenser.

24. A method of assembling the dispenser according to claim 1, the method comprising:
   providing the container, the head part and the applicator;
   attaching the head part at the container;
   filling the container with a fluid at a filling end of the container remote from the head part; and
   welding the container at the filling end.

* * * * *